T. K. HARDMAN.
DIGESTING APPARATUS FOR MAKING EXTRACTS.
No. 183,158. Patented Oct. 10, 1876.
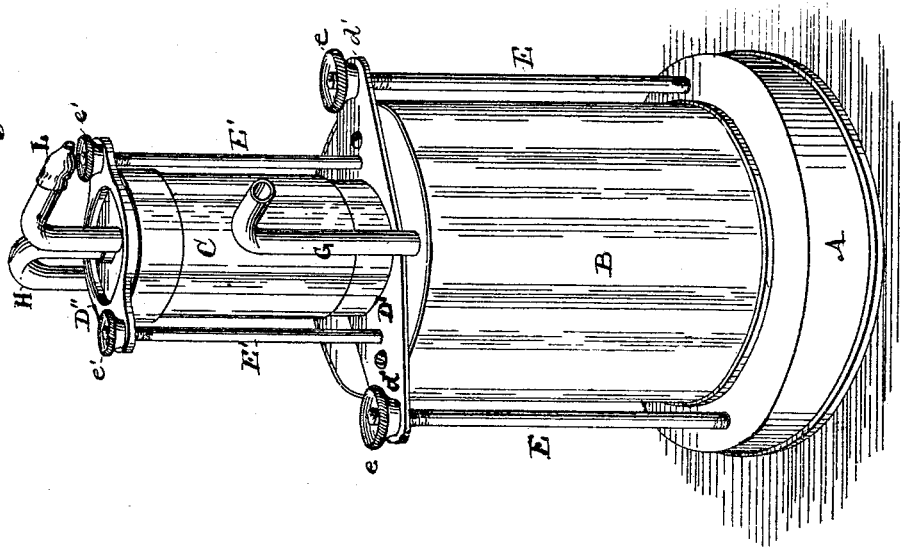
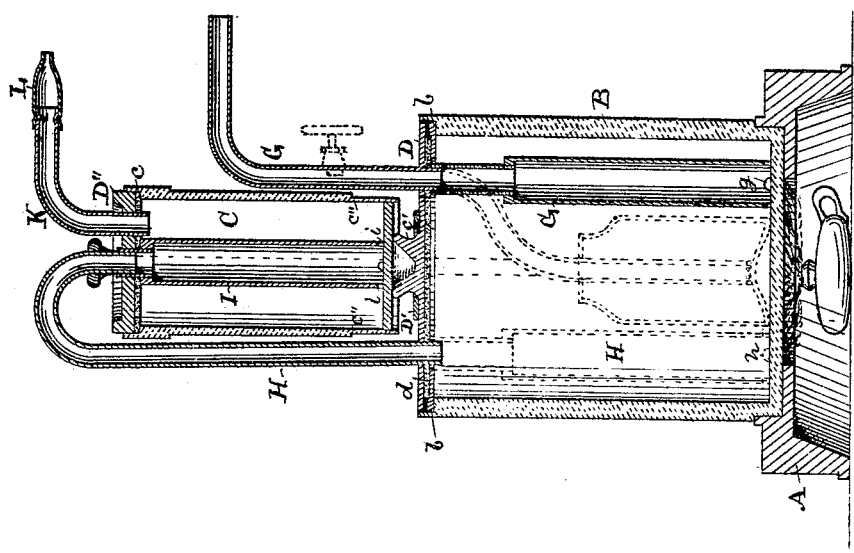

UNITED STATES PATENT OFFICE.

THOMAS K. HARDMAN, OF LA FAYETTE, INDIANA, ASSIGNOR OF ONE-HALF HIS RIGHT TO SAMUEL BANCROFT, OF SAME PLACE.

IMPROVEMENT IN DIGESTING APPARATUS FOR MAKING EXTRACTS.

Specification forming part of Letters Patent No. 183,158, dated October 10, 1876; application filed March 28, 1876.

*To all whom it may concern:*

Be it known that I, THOMAS KAYE HARDMAN, of La Fayette, in the county of Tippecanoe and State of Indiana, have invented certain new and useful Improvements in Digesting Apparatus for Making Extracts; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention consists in a new apparatus to be used in the manufacture of medical preparations, such as fluid extracts and tinctures simple and compound.

In the accompanying drawings, Figure 1 is a perspective view of my apparatus. Fig. 2 is a vertical section of the same.

Referring to the parts by letters, A represents a stand for the support of the apparatus. It is of sufficient height and so formed that a lamp or other heater may be placed beneath it when required. B is a cylindrical vessel, having a closed bottom, the base of which rests upon the stand or frame A. It may be made of any suitable metal, or of glass or other suitable material. I prefer, however, that at least a portion of it be made of a good quality of glass or other transparent material which will not be liable to break through expansion and contraction.

$b$ is a cover which fits tightly over or within the vessel B at its upper end. C is a cylindrical vessel similar in construction to the vessel B, though considerably less in diameter. It also has a close bottom and a tight cover, $c$. The vessel C is arranged above the vessel B, and rests upon a suitable pedestal, $c^1$, but, if preferred, it may be partially inserted within the vessel B, in which case the lower portion of its external periphery, will be made smaller, so as to form a shoulder at $c^2$. D is a plate or disk of metal which rests on the top of the vessel B and over the cover $b$, and $d$ is a similar disk of rubber or other suitable packing which is held between the cover $b$ and disk D, so as to form a tight packing. The disk D may be made with lugs $d'$, or a separate yoke-plate, D′, having projecting lugs $d'$, may be secured to the disk D. D″ is a metal plate or disk which is placed over the vessel C and its cover $c$, and the latter may be made of rubber or other suitable material for forming an air-tight joint. E E are rods, the lower ends of which are secured to the frame or stand A, their upper ends being threaded and passed through holes in the lugs $d'$. $e\ e$ are screw-nuts on the upper ends of the rods E, by means of which the plate D is firmly clamped and held against the upper end of the vessel B, packing $d$, and cover $b$, so as to form an air and steam tight joint, and to keep the vessel B in position. E′ E′ are rods, the lower ends of which are secured to the plate D, and their upper ends threaded and passed through holes in the plate D″; and $e'\ e'$ are screw-nuts on the upper ends of the rods E′, by means of which the plate D″ is firmly clamped upon the cover $c$ and upper end of the vessel C. G is a tube which is placed within the vessel B. It has openings $g$ at its lower end, and its upper end passes through the top of the vessel B, or it may connect with a tube which passes through said cover, as found most convenient or desirable. The portion of this tube G which is within the vessel B may be straight, or bent into any convenient form suitable for inserting into a vial or other receptacle, as shown by dotted lines in Fig. 2 of the drawings. H is another tube, which connects the vessels B and C. It passes out through the cover of the former and in through the top or cover of the latter. The lower end of this tube H may be extended to the bottom of the vessel B, and be provided with holes $h$, as shown by dotted lines in Fig. 2 of the drawings, and if desired the upper and lower parts of the tube may be made separate from the lower portion, and the parts be united in any common manner. I is a tube which is placed within the vessel C. It has holes $i$ at its lower end, and connects at its upper end with the tube H, or, if desired, this tube I may be extended through the cover of vessel C and connect with and form part of the tube H. K is a tube, the lower end of which passes through the cover $c$ of the vessel C, its other end being adapted for connection with any other tube, or for insertion in any receptacle.

The operation of the apparatus is as follows: We will suppose it is to be used as a digester. The root, bark, gum, herb, or flower, or whatever material it may be, after being properly prepared, is placed in the vessel B, and a jet of steam is then introduced through the tube G, which will boil or so act on the contents of the vessel B as to liberate the essential oils or aromatic and volatile portions thereof, and carry them through the pipe H into the vessel C, where they are passed into alcohol or other liquid which holds or retains them. In this way it will be seen I obtain all the medical or other desirable properties contained in the material operated on without loss through volatilization.

In case steam is not available, or it is desirable to boil the material in any particular solution, the tube G may be closed, and a lamp applied beneath the vessel B, when the steam and volatile products will pass as before through the tube H, and into the vessel C, as before described. If preferred, the boiling may be effected by means of a coil of tubing placed within or around the vessel B, and through which a jet of steam is passed, and after the decoction has been made it may be readily discharged by the pressure of steam introduced into the top of the vessel B above its liquid contents, the force of the steam causing the liquid to flow upward through the pipe H, which, in such case, is made to extend to the bottom of the chamber B, and, for convenience of the several operations, the upper portion of the tube G may be provided with a stop cock or valve.

It will also be evident that the vapor of one chemical or compound may be passed into another chemical or compound by having the different chemicals or compounds in the different vessels B or C, or in suitable receptacle placed within said vessels, and in this way my new apparatus may be used for many useful purposes in the chemical laboratory, as well as for medical purposes.

Having described my invention, what I claim as new, and desire to secure by Letters Patent, is—

1. The herein-described apparatus, consisting of the vessels B and C, united by the tube H, and provided with the induction-tube G and eduction-tube K, substantially as and for the purpose specified.

2. The combination of stand A and vessels B and C with covers $b$ $c$, plates D D', and rods E E', substantially as and for the purpose specified.

In testimony that I claim the foregoing as my own I affix my signature in presence of two witnesses.

THOMAS KAYE HARDMAN.

Witnesses:
D. G. STUART,
M. M. ROHRER.